Jan. 26, 1971 K. M. MURGAS ET AL 3,558,224
PHOTOCOPY MACHINE HAVING AN INPUT FEED CONTROL
Filed July 18, 1968 3 Sheets-Sheet 1

INVENTORS
KARL M. MURGAS
BURTON GREENBERG
OTTO A. CLARK
BY
Robert L. Slater, Jr.
ATTORNEY

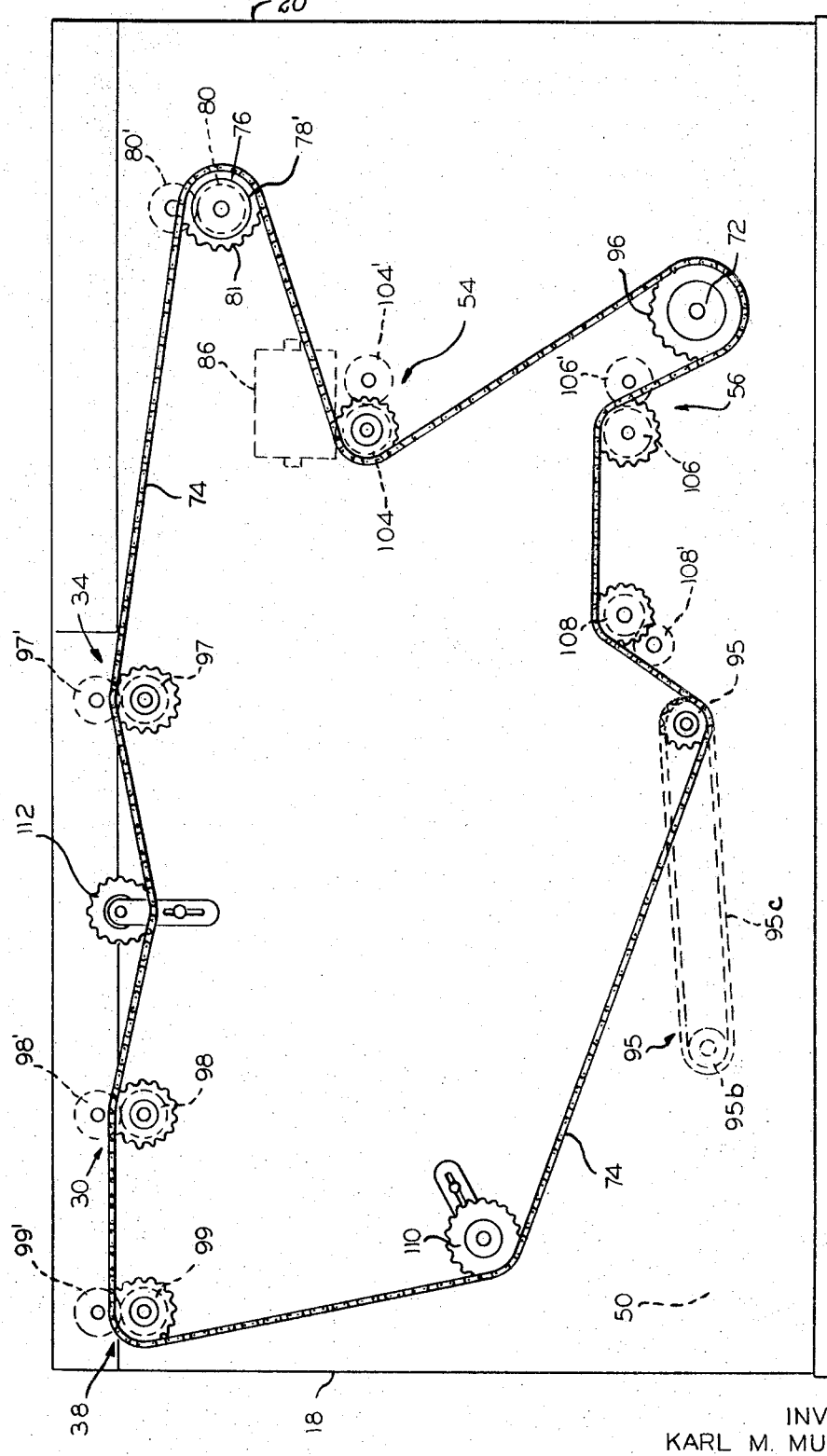

United States Patent Office 3,558,224
Patented Jan. 26, 1971

3,558,224
PHOTOCOPY MACHINE HAVING AN INPUT FEED CONTROL
Karl M. Murgas, Lincolnwood, and Burton Greenberg and Otto A. Clark, Chicago, Ill., assignors to ICP, Inc., Skokie, Ill., a corporation of Illinois
Filed July 18, 1968, Ser. No. 745,842
Int. Cl. G03g *15/00*
U.S. Cl. 355—51          3 Claims

ABSTRACT OF THE DISCLOSURE

A copy paper machine for reproducing increments of a moving original document onto a simultaneously moving single sheet of copy paper. Two paper-sensing switches wired in parallel, one in the document path and one in the copy path, control the copy sheet feeding. The original document commences its movement after the sheet of copy paper is fed into the machine. Initially, a roller means advances the copy paper into the copy paper pathway a first predetermined distance, and then stops. Then, the original begins its movement across the original document pathway, and after moving a second predetermined distance, the roller means restarts and again advances the copy paper. A second sheet of copy paper may be advanced by the roller means for at least said first distance after the trailing edge of the copy paper moves past the first distance or before the trailing edge of the original moves past the second distance.

BACKGROUND OF THE INVENTION

The present invention relates generally to a photocopy reproduction system for photocopy devices including electrostatic photocopy machines, and more particularly relates a single sheet copy paper input feed for a photocopy machine which enables the original document to be inserted into the photocopy machine any time after a single sheet of photocopy paper has been inserted into the machine.

Electrostatic photocopy devices are commonly constructed to pass a specially coated and electrostatically charged sheet of copy paper through the focal plane of an optical conversion system. The original document to be copied is positioned before the objective camera lens. The image of the document is transferred through the optical camera system and onto the sensitized surface of the copy paper. The exposed or sensitive surface of the copy paper is then passed through a fluid suspension of ink particles suitably charged to react with the electrostatically charged image borne upon the copy paper surface.

The invention herein utilizes the aforedescribed principles of operation in a system in which the original document is transported before the objective lens of the camera of the photocopy machine, and simultaneously a sheet of sensitized copy paper is moved in the camera focal plane at a direction and speed coordinated with the changing image transferred through the camera optical system. Thus, the images or increments of the original document are transferred onto the copy paper.

Generally, individual sheets of copy paper having a predetermined area size, have been either automatically dispensed from a stack or supply of sheets into the copy paper reproduction pathway or manually inserted individually into the pathway. In the automatic operation, frequently more than one copy paper sheet were dispensed during a single reproduction cycle. Aside from the obvious waste of costly copy paper, the copy paper transmission system usually was unable to provide coordinated movement of the copy paper with respect to the movement of the original document when more than one sheet of copy paper was transported at one time. Therefore, any reproduction was usually blurry and unclear.

Another problem with the automatic sheet dispensers are their inability to consistently feed the copy sheets properly into the reproduction pathway. Thus, frequently the reproductions were angular and slanted, and at times substantial portions of the original document were not reproduced onto the copy paper. Moreover, the improper feed quite often resulted in jamming inside the copy paper pathway, which required appreciable time and effort to remove.

In the manual feed of the individual sheets into the copy paper pathway, it was required heretofore, to insert the copy paper and the original document simultaneously into the machine. A slight delay in inserting either the document or the copy paper frequently resulted in less than all of the document being reproduced onto the copy paper. Moreover, although the operator fully concentrated on simultaneously inserting the document and copy paper, he was unable to manipulate the sheets of paper so that they were properly inserted into their respective inputs. This generally resulted in poor reproductions, and sometimes either the document or copy paper jammed in its corresponding pathway. With the invention herein, it is no longer required to simultaneously insert the original document and copy paper into the machine.

SUMARY OF THE INVENTION

The present invention provides a single sheet copy paper feed means which does not require the original document and copy paper to be inserted simultaneously.

The copy paper feed means automatically positions the copy paper in a standby position after being inserted into the machine. Automatically after the original document is inserted in the machine, the sheet of copy paper is transferred through the copy paper pathway coordinated with the movement of the original document.

Accordingly, a primary object of our invention is to provide a photocopy machine which does not require an original document and a sheet of copy paper to be inserted simultaneously into the machine.

Another object is to provide a photocopy machine which is not susceptible to jamming.

Another object is to provide a photocopy machine which is simple to operate so that the operator may easily insert both the original document and the sheet of copy paper properly into the system.

Another object is to firmly position the copy paper in a standby position until the original document is inserted into the system.

Still another object is to provide a copy machine which does not require the copy paper and original document to be simultaneously inserted into the machine, but transports the original document in a coordinated manner during the reproduction operation.

These and other objects and advantages of the invention will become apparent from the illustrations in the accompanying drawings and the following specifications and claims.

BRIEF DESCRIPTION OF THE DRAWINGS

Referring to the drawings in which the same characters of reference are employed to indicate corresponding or similar parts throughout the several figures of the drawings.

FIG. 5 is an enlarged side view of the photocopy machine with the side panel removed to show the mechanical drive system for the photocopy machine.

DESCRIPTION OF THE PREFERRED EMBODIMENT

Figure 1:
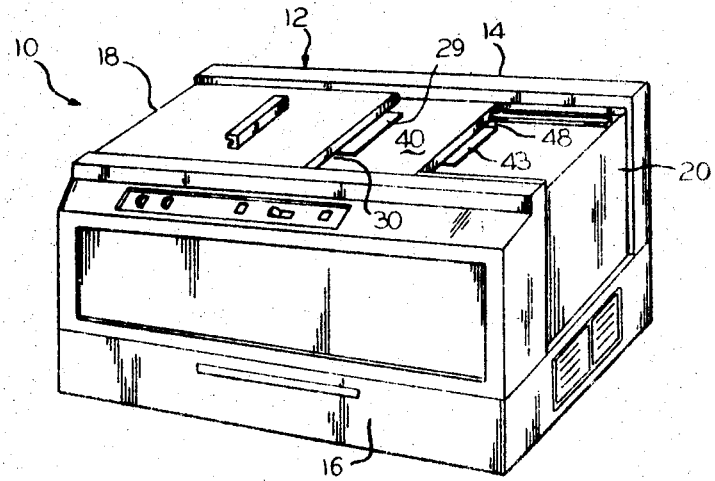
FIG. 1 is a perspetcive view of a photocopy machine embodying the principles of the invention.
Figure 4:
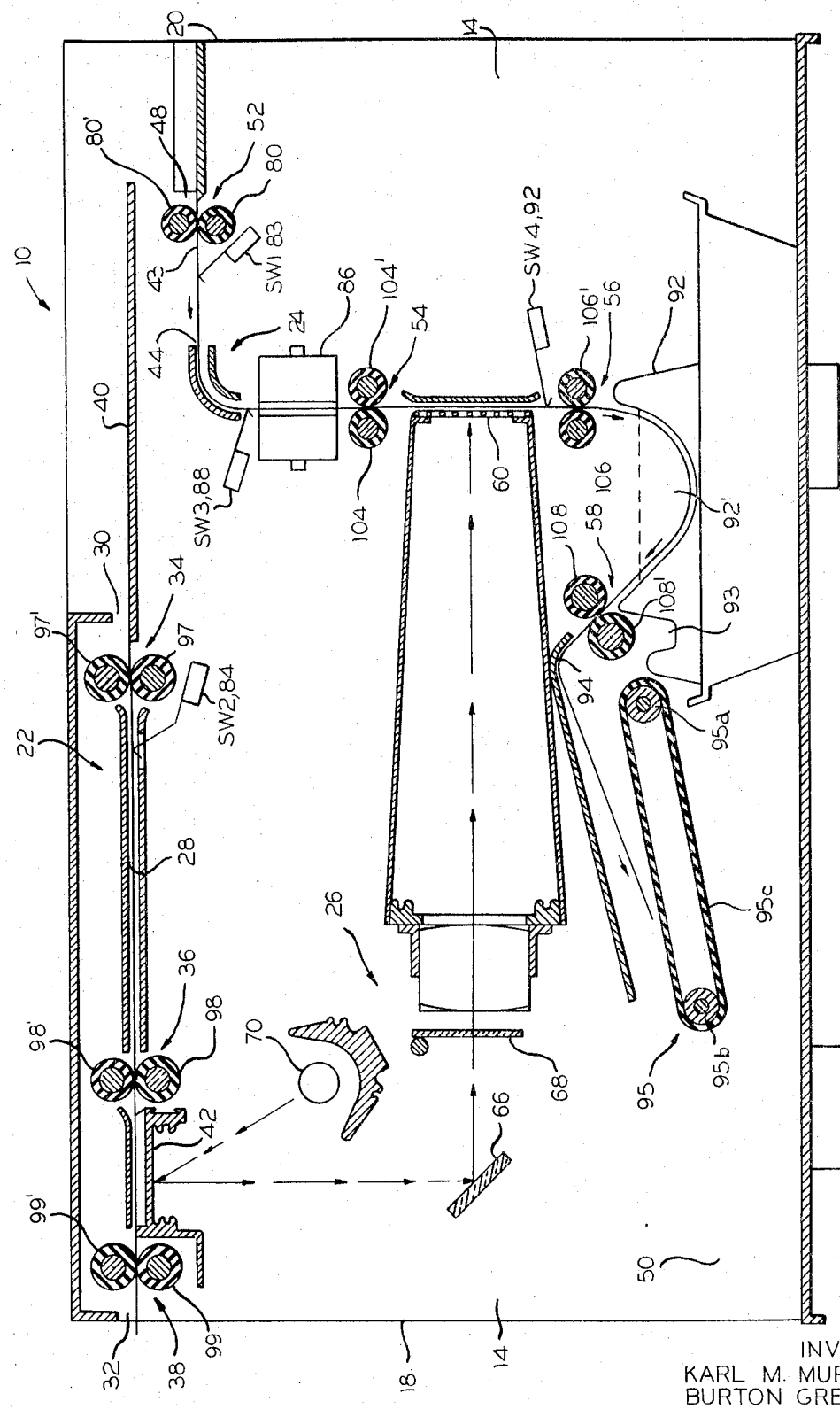
FIG. 4 is an enlarged sectional mechanical schematic view of the photocopy machine.

Referring now to FIGS. 1 and 4 of the drawings, the reference numeral 10 indicates generally a photocopy reproduction machine embodying the principles of the invention. The photocopy machine 10 comprises a substantially rectangular frame 12 (FIG. 1) having a pair of opposed sidewalls 14, 16, a front side 18 and a rear side 20. The photocopy machine 10 comprises an original document transport system 22, a copy paper transport system 24 and a stationary camera means 26 (FIG. 4).

The original document transport system 22 comprises a pathway 28 for transporting an original document 29 from an input end 30 at the rear side 20 of the machine to an output end 32 at the front side 18 of the machine 10 (FIG. 4). A plurality of pairs of cooperating rollers indicated generally by the numerals 34, 36 and 38 are spaced apart within the pathway 82 and move the inserted document between the input end 30 and output end 32.

The original document is initially positioned on a feed platform 40 before being manually inserted into the input end 30 of the machine 10 (FIGS. 1 and 4).

A transparent glass scaning window 42 is mounted in the original document pathway 28 between roller pairs 36, 38. The image of an increment or portion of the document moving across the window 42 is transferred by the camera means 26, onto a sheet of photosensitive copy paper 43. As shown, the roller pairs 36, 38 are disposed adjacent the opposite sides of the scanning window 42. Thus, the moving document 29 is maintained taut, as it is conveyed across the scanning window 42.

The copy paper transport system 24 comprises a copy paper pathway 44 (FIG. 4), for transporting the sheet of copy paper 43 from a copy paper input end 48 at the rear side 20 to a copy paper output end 50 at the front side 18 of the machine 10.

An input pair of cooperating rollers 52 transports the sheet of copy paper 43 from the copy paper input end 48 into pathway 44. As will be more fully explained later in the description, the movement of the copy paper stops in a standby position shown in FIG. 3. After the original document 29 is inserted into the input end 30, the copy paper automatically begins to move and is conveyed from the input pair of rollers 52, through the pathway 44 by cooperating roller pairs indicated respectively by the numerals 54, 56 and 58, to the copy paper output end 50 at the front side 18 of the machine 10.

Figure 3:
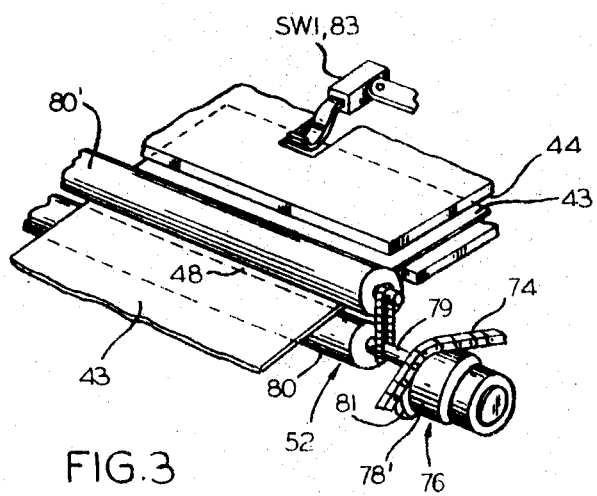
FIG. 3 is an enlarged fragmentary perspective view of the copy paper input feed means of the photocopy machine.

An image receiving section 60 is disposed between roller pairs 54, 56 (FIG. 3). The image of the original document moving across the scanning window 42 is conveyed by the camera means 25 onto the sheet of copy paper 43 moving across the image receiving section 60. The section 60 may be formed from a nylon cord material into a ladder type configuration having a rectangular outer perimeter an spaced apart cords extending from one elongated side to the opposite side. Other suitable materials and other configurations may be used provided they do not affect the sharpness or definition of the transferred image of the original document. As shown, roller pairs 54, 56 are positioned adjacent the opposite sides of the image receiving section 60. Similar to the function of roller pairs 36, 38, in the original document transport system, roller pairs 54, 56, maintain the copy paper taut as it travels across the image receiving section 60.

The camera means 26 (FIG. 4) comprises a reflecting mirror 66 positioned to receive the image of the original document moving across the scanning window 42 and reflects the image into the focal plane of an objective lens 68. The objective lens 68 focuses the image of the original document onto the photosensitive copy payer 43 moving across the image receiving section 60.

A high intensity lamp 70 is beamed into the scanning window 42 during the period of reproduction. The cooperation of the reflecting mirror 66, the objective lens 68 and the high intensity lamp 70 controls the image reflection, sharpness and definition of the photocopy.

A motor 72 (FIGS. 2 and 5) drives a continuous revolving chain 74 (FIG. 5). Before the original document 29 and copy paper 43 are inserted into the machine and during the time the original document and copy paper are simultaneously being transported respectively through the document transport system 22 and copy paper transport system 24, the roller pairs 34, 36, 38 of the original document transport system 22 and the roller pairs 52, 54, 56 and 58 of the copy paper transport system 24 are continuously and simultaneously driven by the revolving chain 74 at substantially the same rate of speed.

A clutch means indicated generally by the reference numeral 76 (FIGS. 2, 3 and 5) controls the linkage of the input rollers 52 with the chain 74. The clutch means 76 may comprise a rectifier means 77 (FIG. 2) for converting alternating-current voltage to a direct-current voltage for energizing an electromagnet 78 enclosed within a housing 78'. The rectifier means 77 may be a conventional full wave rectifier. The energizing of the electromagnet mechanically links a shaft 79 of the input drive roller 80 of the input roller pair 52 to a clutch sprocket 81 (FIGS. 3 and 5). The teeth of the sprocket 81 engage the drive chain 74. Normally, the electromagnet is energized and the clutch sprocket 81 is locked to the drive roller 80, causing the input rollers 52 to rotate as the sprocket 81 is rotated by the chain 74.

A copy paper standby switch SW1, 83 (FIGS. 2, 3 and 4) is positioned in the copy paper pathway 44 adjacent to and inward from the input feed roller pair 52. The standby switch SW1, 83 has a normal position for applying line 1 voltage of the alternating current, A.C., input power A.C., to the clutch means 76 to energize the electromagnet 78 and maintain it in its energized state (FIG. 2); and a standby position to sever the A.C. line 1 voltage from the clutch means 76 to deenergize the electromagnet 78. The standby switch SW1, 83 is switched from the normal position to the standby position by the leading edge of the copy paper 43. FIG. 3 illustrates the copy paper 43 in the standby position when the standby switch SW1, 83 is in the standby position.

A control switch SW2, 84 (FIGS. 2 and 4) is positioned adjacent to and inward from the input roller pair 34 of the original document transport system 22. The control switch SW2, 84 is switched from a normal or off position to an on position by the leading edge of the original document. In the on position, switch SW2, 84 applies one side of the A.C. power line to the clutch means 76 to energize the electromagnet 78 previously deenergized by the leading edge of the copy paper 43. When the control switch SW2, 84 is in the on position, the copy paper is automatically fed into the copy paper pathway 28. The original document and sheet of copy paper 43 move simultaneously and substantially at the same rate of speed through their respective transport systems 22, 24. Although the foregoing discussion describes the A.C. voltage as energizing the electromagnet 78, it should be apparent that the applying and severing of the A.C. voltages cause respectively the rectifier means 77 to apply and sever D.C. voltage from the electromagnet 78.

The copy paper 43 is transported from the input feed rollers 52 through a corona section 86 (FIG. 4) which charges a coated side of the copy paper 43. After passing through corona section 86, the photosensitive copy paper is ready to receive the image of the original document for reproduction.

An exposure switch SW3, 88 is positioned adjacent the input to the corona section 86, as shown in FIG. 4. Before the copy paper enters the corona section 86, the leading edge of the copy paper switches the exposure switch SW3, 88 (see FIG. 2) from a normally off position to an on position. In the on position, switch SW3, 88 energizes a relay 90 which closes a relay switch 90a to connect line 2 voltage to a high voltage power supply 91 and to the high intensity lamp 70. This turns on power supply 91 and energizes the high intensity lamp 70. Power supply 91 supplies high voltage to the corona section 86 to sensitize the copy paper as it passes through.

A hold switch SW4, 92 is positioned in the copy paper pathway 44 between the output side of the image receiving section 60 and roller pair 56, as shown in FIG. 4. The hold switch SW4, 92 is switched from an off position to a hold position by the leading edge of the copy paper after the leading edge has moved across the image receiving section 60. In the hold position for switch SW4, 92, the high intensity lamp 70 and high voltage power supply 91 are maintained "on" until the entire length of the sheet of copy paper has passed across the image receiving section 60. When the trailing edge of the copy paper moves past the hold switch SW4, 92, the hold switch automatically returns to its off position, whereby relay 90 deenergizes, causing the lamp 70 and high voltage power supply to turn "off."

The camera means 26 (FIG. 4) transfers the images of the portions or increments of the original document passing across the scanning window 42 onto the portion of copy paper 43 moving at the same rate of speed across the image receiving section 60.

A receptacle 92 containing toner solution 92' is positioned between roller pairs 56 and 58. Roller pair 56 feeds the exposed copy paper into the toner solution 92'. The toner solution 92' develops the exposed copy paper.

The curvature of the inside surface of receptacle 92 provides a smooth pathway out from the receptacle and into the grip of roller pair 58. A guide wall 94 directs the developed copy paper onto an output conveyor 95 where it is transported to the copy paper output 50. Conveyor 95 comprises a drive shaft 95A (FIG. 5) driven by the main chain 74 and an idler shaft 95B spaced from the drive shaft 96. Rubber "O" type rings 95C are positioned on the drive shaft 95A and idler shaft 95B and span thereacross. The rotation of the drive shaft 95A causes the rings 95C to rotate and the copy paper is thereby conveyed to output 50.

Turning now particularly to FIGS. 4 and 5, the mechanical drive for the original document transport system 22 and the copy paper transport system 24 will be more fully decribed. The motor 72 drives a main sprocket 96 which continuously drives the chain 74. The lower or inward rollers 97, 98 and 99 respectively of roller pairs 34, 36 and 38 of the original document transport system 22 are coupled to the chain 74 and function as drive rollers. The other rollers of each pair indicated by the reference numerals 97', 98' and 99' are idler rollers.

The outward rollers 104, 106 and 108 of roller pairs 54, 56 and 58 and lower roller 80 of roller pair 52 are coupled to the chain 74 and function as drive rollers for the copy paper transport system 24. The other roller of each pair indicated by the reference numerals 80', 104', 106' and 108' are idler rollers.

The chain 74 normally drives the drive rollers 97, 98, 99, 80, 104, 106 and 108. Drive roller 80 of the copy paper input roller pair 52 is disassociated from the chain 74 by the clutch means 76 after the leading edge of the copy paper switches standby switch SW1, 83, into its standby position. Idler sprockets 110, 112 (FIG. 5) are provided to afford means for varying the slack in the drive chain 74.

OPERATION

Figure 2:
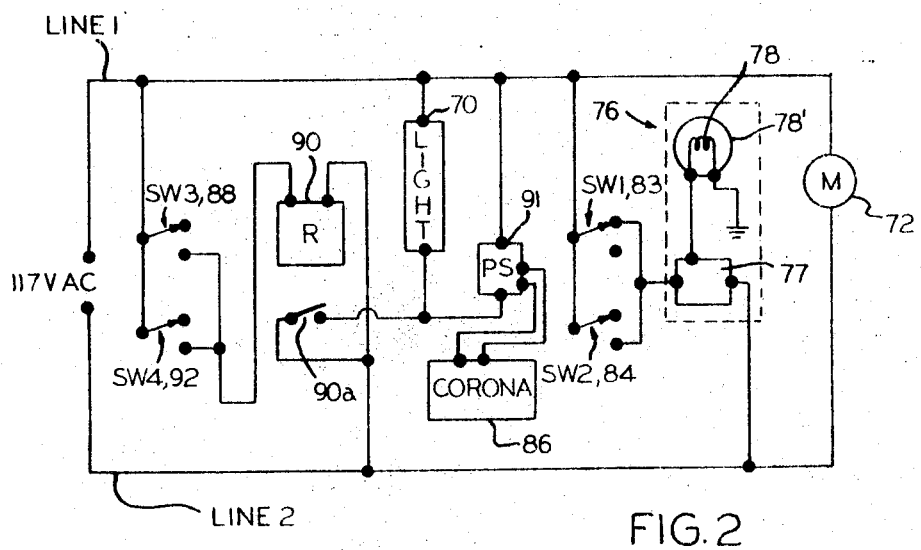
FIG. 2 is an electrical schematic layout showing the switching and control circuits for the machine.

Turning now particularly to FIGS. 2 and 4, the sequence of the photocopy operation will now be described with greater detail. FIG. 2 shows the various switches in their normal positions prior to the commencing of the photocopy operating cycle.

The copy paper 43 must be inserted into the machine first. The input feed rollers 52 transports the copy paper from the copy paper input end 48 into the copy paper pathway 44. The leading edge of the copy paper switches the standby switch SW1, 83 from it normal or on position to a standby position causing the deenergizing of the electromagnet of the clutch means 76. The deenergizing of the electromagnet mechanically disassociates the drive roller 80 of the roller pair 52 from the drive chain 74, which instantly stops any further movement of the copy paper. Thus, in the standby position of switch SW1, 83, the copy paper is firmly and positively held in place by the input roller pair 52, as may be seen by viewing FIG. 3. Now, the original document may be inserted into the machine at the convenience of the operator.

When the original document is inserted into the machine, its leading edge switches the control switch SW2, 84 from its normal position (see FIG. 2) to the on position. In the on position of control switch SW2, 84 the electromagnet of the clutch means 76 is again energized to mechanically couple the drive roller 80 of input roller pair 52 to the drive chain 74. Now the copy paper is transported through the copy paper transport system 24 at the same speed as the original document 29 is moving.

The distance from the standby switch SW1, 83 to the image receiving section 60 is substantially equal to the distance from the control switch SW2, 84 to the scanning window 42. Thus, exact reproduction of the document onto a sheet of copy paper is achieved without simultaneously inserting the copy paper with the document. Hence, the operator is able to first insert the copy paper evenly into the copy paper pathway 44, and then subsequently at his convenience, insert the original document also evenly in the original document pathway 28. In this manner, clear and identical reproductions of the original documents are obtained. Moreover, by not requiring simultaneous feeding of the original document and the copy paper, the probability of jamming due to improper feed of the original document into the original document transport system 22 and the copy paper into the copy paper transport system 24 is virtually eliminated.

Prior to the copy paper reaching the corona section 86, the leading edge of the copy paper switches the exposure switch SW3, 88 from the normal position to the on position to cause the high intensity lamp 70 and the high voltage power supply 91 to be turned "on." The leading edge of the copy paper after passing the image receiving section 60 switches the hold switch SW4, 92 from the off position to the hold position which maintains the high intensity lamp 70 and the high voltage power supply 91 "on" after switch SW3, 88 has returned to its off position. Switch SW4, 92 remains in the hold position until entire document has been reproduced onto the sheet of copy paper. After the trailing edge has past switch SW4, 92, it returns to its off position.

The exposed sheet of copy paper then proceeds through the toner solution 92 and finally is transported to the copy paper output 50. The original document after being inserted at the input end is conveyed through its pathway 28 until reaching the original document output 38.

From the drawings and foregoing description, it should be apparent that a novel photocopy machine has been provided which accomplishes the aforestated objects in an efficient and improved manner. By providing automatic means to stop the movement of the copy paper after it is inserted into the machine, it is no longer necessary to simultaneously insert the document and sheet of copy paper into the system. Due to the invention herein, the operator may insert the copy paper into the machine, and at his convenience insert the original document into the system. Thus, the previous problems of unusable copies and jamming of either the document or copy paper due to improper feed is prevented.

Although the description and drawings specify the copy paper to be inserted first and then the original document, the control structure of the invention may be rearranged so that the sequence is reversed whereby the original document would be inserted first and then the copy paper.

The description of the preferred embodiment of this invention is intended mererly as illustrative of this invention, the scope and limits of which are set forth in the following claims.

We claim:

1. In a reproduction apparatus including an original document transport system for transporting an original document sheet through a document pathway, a copy paper transport system for transporting a copy paper sheet through a copy paper pathway, reproducing means for transferring the image of the document onto said copy paper, and an input feed control means, said input feed control means comprising:
   a roller means for moving one of said sheets along the corresponding pathway;
   a power means for driving said roller means and thereby moving said one sheet into the pathway;
   a first switch means having a normally on-position and a standby-position, said roller means being driven by said power means when said first switch means is in the on-position, the leading edge of one of said sheets causing said first switch means to switch from the on-position to the standby-position; and
   a second switch means having an on-position and a normally off-position, said roller means being driven by said power means when said second switch is in the on-position, the movement of the other side of said sheets causing the second switch means to switch from the off-position to the on-position, said roller means being operatively disconnected from said power means when said first switch means is in the standby-position and said second switch means is in the off-position.

2. In the reproduction apparatus of claim 1, wherein:
   said power means comprises a moving chain;
   said roller means comprises a pair of cooperating rollers for moving said one sheet into the corresponding pathway, one of said rollers being a drive roller; and
   clutch means for coupling and decoupling said drive roller from the chain, said clutch means including an electromagnet, said first switch means and said second switch means providing an electrical current path for energizing the electromagnet when in the on-position to cause coupling of the drive roller with the chain, said electrical path being severed when said first switch means is in the standby-position and said second switch means is in the off-position, thereby causing decoupling of the drive roller from the chain.

3. The reproduction apparatus of claim 2 wherein:
   a scanning window is disposed in the original document sheet pathway and an image receiving section is disposed in the copy paper pathway, said one sheet being the copy paper sheet and said other sheet being the document sheet, said first switch means and roller means being positioned in the copy paper pathway and said second switch means being positioned in the original document pathway, the distance between the first switch means and the image receiving section being substantially equal to the distance between the second switch means and the scanning window, the leading edge of the document sheet moving the second switch means from the off to the on-position, said second switch means returning to the off-position after the trailing edge of the document moves past the second switch means, said first switch means returning to the on-position after the trailing edge of the copy paper moves past the first switch means.

References Cited

UNITED STATES PATENTS 3,345,926   10/1967   Tiger _____ 355—14X
3,352,218   11/1967   Ostensen _____ 355—14

NORTON ANSHER, Primary Examiner

K. C. HUTCHISON, Assistant Examiner

U.S. Cl. X.R.

355—66